(12) United States Patent
Warner

(10) Patent No.: US 6,386,712 B1
(45) Date of Patent: May 14, 2002

(54) EXTERIOR REAR VIEW MIRROR HAVING WATER REMOVAL HOLE WITH TURBULENT FLOW GENERATOR

(75) Inventor: Daniel R Warner, Grand Blanc, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/708,953

(22) Filed: Nov. 8, 2000

(51) Int. Cl.[7] .............................. G02B 7/182; B60R 1/06
(52) U.S. Cl. ........................ 359/507; 359/509; 359/871; 359/872
(58) Field of Search ................................. 359/507, 508, 359/509, 871, 872

(56) References Cited

U.S. PATENT DOCUMENTS

| | | | |
|---|---|---|---|
| 2,796,506 A | * | 6/1957 | Lumbert |
| 4,136,925 A | * | 1/1979 | Menzies et al. |
| 4,449,796 A | | 5/1984 | Janssen et al. |
| 4,464,017 A | * | 8/1984 | Wada |
| 4,782,912 A | | 11/1988 | Wandless |
| 4,898,458 A | | 2/1990 | McDonald |
| 5,353,466 A | * | 10/1994 | Smith et al. |
| 5,621,570 A | * | 4/1997 | Hack et al. .................. 359/507 |
| 5,865,863 A | | 2/1999 | DeSousa et al. |
| 5,903,389 A | | 5/1999 | Rumez et al. |
| 6,010,222 A | | 1/2000 | Olsen et al. |

FOREIGN PATENT DOCUMENTS

DE 4028983 * 3/1992 .................. 359/509

* cited by examiner

Primary Examiner—Ricky D. Shafer
(74) Attorney, Agent, or Firm—Mark P Calcaterra

(57) ABSTRACT

An exterior rear view mirror assembly for an automotive vehicle is provided including a bracket for attachment to a side portion of a vehicle, a mirror housing having a rear opening connected to the bracket and extending laterally therefrom, a mirror connected within the mirror housing generally adjacent the mirror housing rear opening, a water removal hole penetrating a bottom end of the mirror housing for allowing precipitation entrapped within the mirror housing to escape therefrom, a turbulent flow generator formed forwardly adjacent of the water removal hole to cause turbulent air flow past the removal hole to diminish wind noise being generated by the water removal hole.

18 Claims, 3 Drawing Sheets

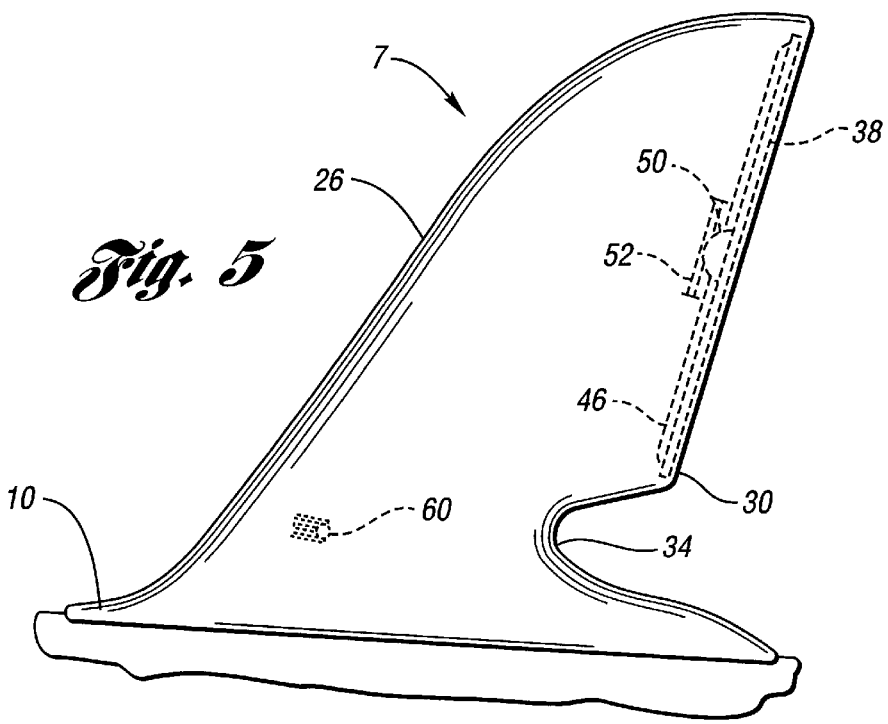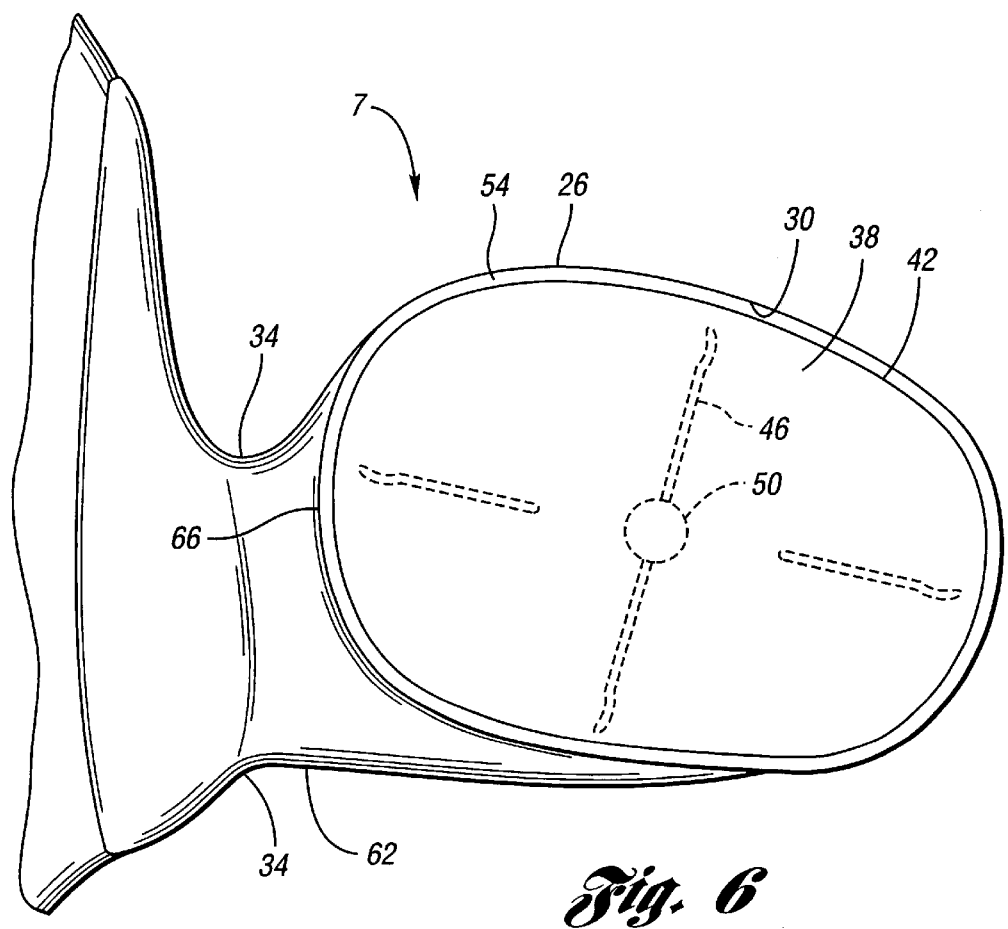

EXTERIOR REAR VIEW MIRROR HAVING WATER REMOVAL HOLE WITH TURBULENT FLOW GENERATOR

FIELD OF THE INVENTION

The field of the present invention is that of exterior rear view mirrors for automotive vehicles. More particularly, the field of the present invention relates to exterior rear view mirrors for automotive vehicles having a hole or orifice to allow for removal of entrapped water and additionally having a turbulent flow generator to prevent the generation of air noise through the water removal hole.

BACKGROUND OF THE INVENTION

Automotive vehicles are equipped with exterior rear view mirrors to allow the driver to see objects rearward of the vehicle. At one time, most rear view mirrors were positioned on a post that was attached to the exterior of a vehicle door or to the A pillar. In the most recent quarter-century, there has been a major effort to increase fuel economy of automotive vehicles. To achieve increased fuel economy, one technical trend has been to diminish a vehicle's aerodynamic drag. At higher speeds, aerodynamic drag can represent nearly 50% of the power required to translate a vehicle. Therefore, any reduction in the aerodynamic drag has the potential to lead to the enhancement of the vehicle's fuel economy.

In light of the above-noted trend, many vehicles now attach the rear view mirror assembly to a forward, upper end of the vehicle door. The rear view mirror assembly has a bracket with a mirror housing extending therefrom. The mirror housing provides an aerodynamic cover for the mirror and mounts the same. The mirror is typically pivotally mounted within the mirror housing to allow for adjustment by a powered mechanism or by manual manipulation. To allow the mirror to pivot with respect to the mirror housing, a required slight clearance between the mirror housing and the mirror is provided. The clearance between the mirror housing and the mirror allows precipitation to enter the mirror housing. Also, while a vehicle is being washed, water can enter the clearance. Although many mirror housings are fabricated from a molded plastic which will not rust, it is preferable to provide an orifice, hereinafter referred to as a water removal hole, to allow entrapped water within the mirror housing to immediately escape.

For reasons mentioned above, it is desirable that the mirror housing reduce as much any aerodynamic drag as possible that is caused by the rear view mirror. Accordingly, the mirror housing is formed to generate laminar air flow about its surfaces. In certain situations, the laminar air flow about the surface of the mirror housing can inadvertently enter into the water removal hole and generate a wind noise such as a whistle. The wind noise is resultant of a standing wave, functionally similar to the sound made when one blows across the narrow neck of an opened glass bottle of soda. The noise is more audible to a vehicle occupant since the mirror housing and bracket are exposed to the space between the body panels of the vehicle. While the wind noise has no functional degradation to the operation of the rear view mirror assembly, some vehicle drivers or occupants may find it to be mildly unpleasant.

It is therefore also desirable to provide a rear view mirror having a mirror housing with a water removal hole which does not generate wind noise.

SUMMARY OF THE INVENTION

To make manifest the above desires, the revelation of the present invention is brought forth. In a preferred embodiment the present invention provides an exterior rear view mirror assembly for an automotive vehicle. The rear view mirror assembly includes a bracket for attachment to a side portion of the vehicle. A mirror housing is connected to the bracket. The mirror housing has a rear opening and extends laterally from the bracket. A mirror is connected within the mirror housing at a position generally adjacent to the mirror housing rear opening. A water removal hole penetrates a bottom end of the mirror housing adjacent a forward end of the mirror housing to allow water entrapped within the mirror housing to escape. The mirror housing bottom end has a generally rising slope forward and adjacent the water removal hole on which three turbulent flow generators are formed. The turbulent flow generators cause turbulent airflow past the water removal hole to diminish noise being generated by the water removal hole. The turbulent flow generators have a generally triangular cross-sectional shape with a longest leg of the triangle being generally adjacent to the lower end of the mirror housing. The turbulent flow generators extend longitudinally along the travel direction of the vehicle. The two outer turbulent flow generators bracket the water removal hole.

It is a feature of the present invention to provide a rear view mirror assembly for an automotive vehicle comprising a mirror housing with a water removal hole and turbulent flow generators to diminish or eliminate the wind noise generated by air flowing through the water removal hole.

Other feature s of the invention will be more apparent to those skilled in the art upon a reading of the following detailed description and upon reference to the drawings.

BRIEF DESCRIPTION OF THE DRAWINGS

FIG. 5 is a top plane view of the rear view mirror shown in FIG. 1.

FIG. 6 is rear elevational view of the rear view mirror shown in FIG. 1.

DETAILED DESCRIPTION OF THE INVENTION

Figure 1:
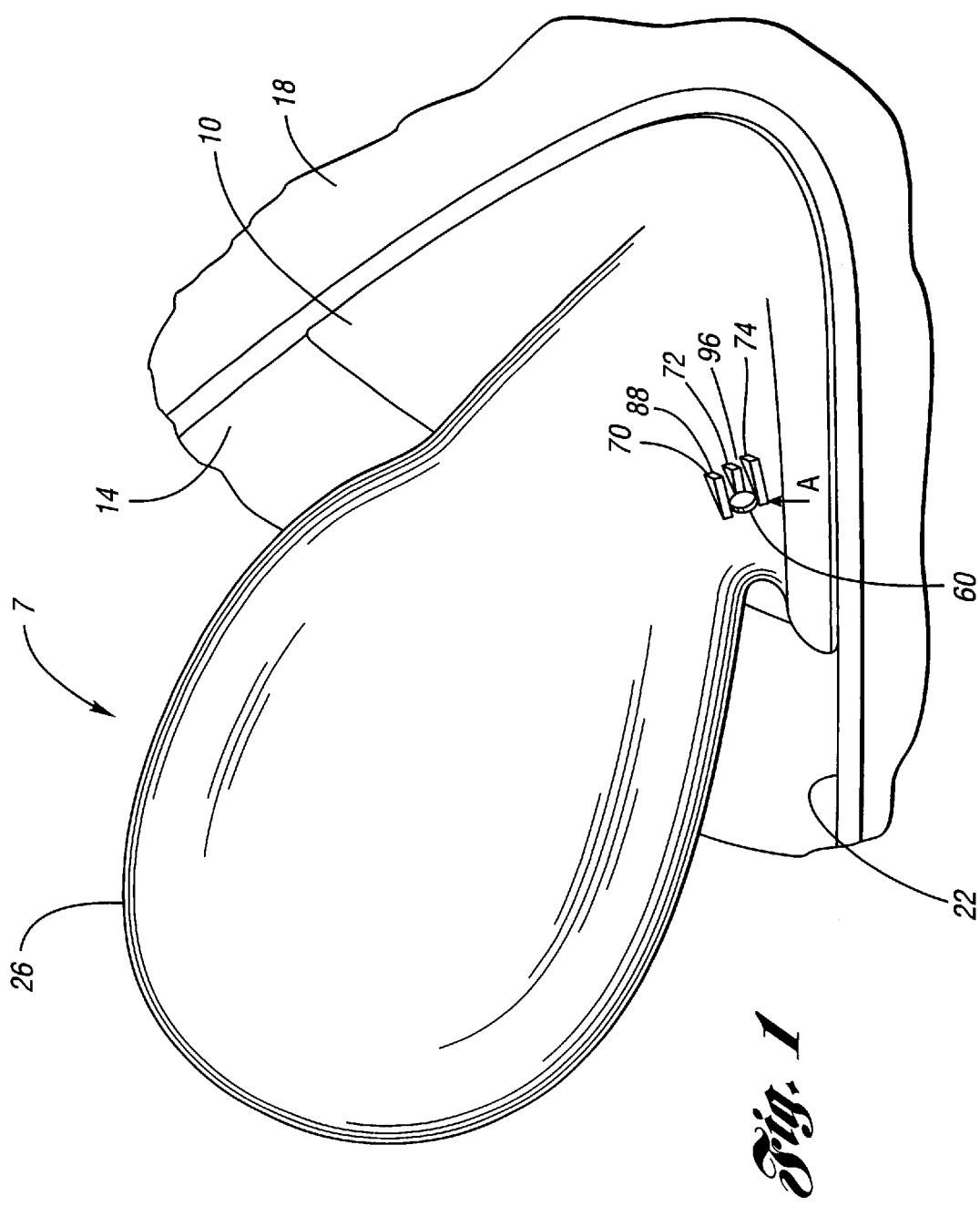
FIG. 1 is a bottom perspective view of a rear view mirror according to the present invention looking from the exterior of the vehicle toward the interior of the vehicle.
Figure 2:
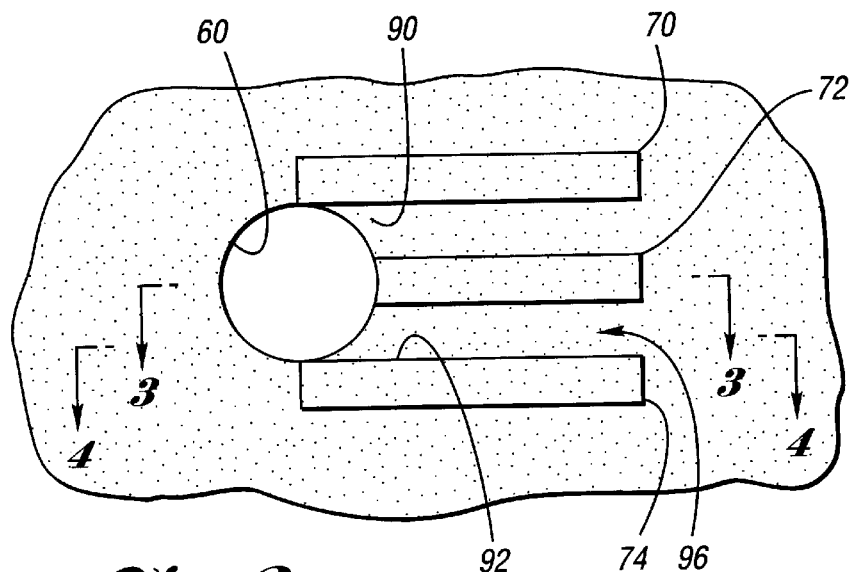
FIG. 2 is an enlarged bottom plan e view of the rear view mirror shown in FIG. 1.

Referring to FIGS. 1 through 6, an exterior rear view mirror assembly 7 according to the present invention is shown. The mirror assembly 7 has a bracket 10 that is attached by threaded fasteners (not shown) to a side portion of a vehicle adjacent one of the vehicle side windows 14. In the embodiment shown, the bracket 10 is attached to an A-pillar portion of the vehicle door frame 18. In other embodiments, (not shown) the bracket 10 may be connected to the vehicle door underneath the belt line 22.

A mirror housing 26 is connected to the bracket 10 and extends laterally outboard from the bracket 10. As shown, bracket 10 and mirror housing 26 are formed from a unibody construction. A preferred method of manufacture is by injection molded plastic. The mirror housing 26 has a rear opening 30. Adjacent bracket 10, the mirror housing 26 has a narrow bottom end portion 34 (FIGS. 5 and 6).

Adjacent the rear opening 30 is a mirror 38. The mirror 38 has an outer perimeter 42 which is closely aligned with the mirror housing rear opening 30. The mirror 38 is connected to supports 46 which support the mirror 38 from its pivotal mounting 50. The pivotal mounting 50 is connected to a mirror mounting frame 52 (only partially shown in FIG. 5. The mirror mounting frame 52 is insertably connected within mirror housing 26 through mirror opening 30. The mirror 38 can be manually adjusted (or power adjusted in an embodiment, not shown) to suit the vision requirements desired by the vehicle driver or passenger side seat occupant. However, to allow for adjustment of the mirror 38 about its pivot 50, there must be a slight clearance 54. Unfortunately, clearance 54, also allows water and precipitation from rain or snow, to enter mirror housing 26.

To allow for the escape of water entrapped within the mirror housing 26, an orifice or water removal hole 60 is provided. Water removal hole 60 is on a bottom end 62 of the mirror housing 26. Water removal hole 60 is positioned more inboard than an extreme end 66 of rear opening 30 and is shown positioned in the narrow portion bottom end 34 of mirror housing 26.

Figure 3:
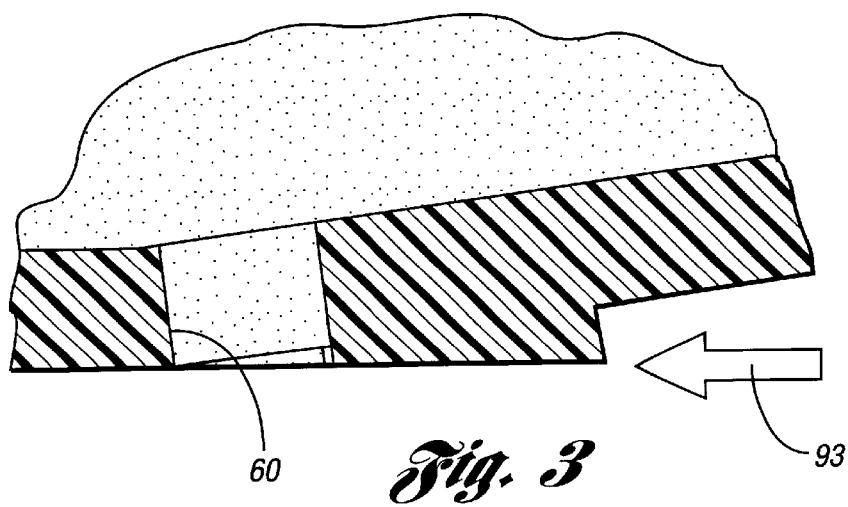
FIGS. 3 and 4 are enlarged views taken along lines 3—3 and 4—4 of FIG. 2, respectively, with FIG. 4 having a greater enlargement than FIG. 3.
Figure 4:
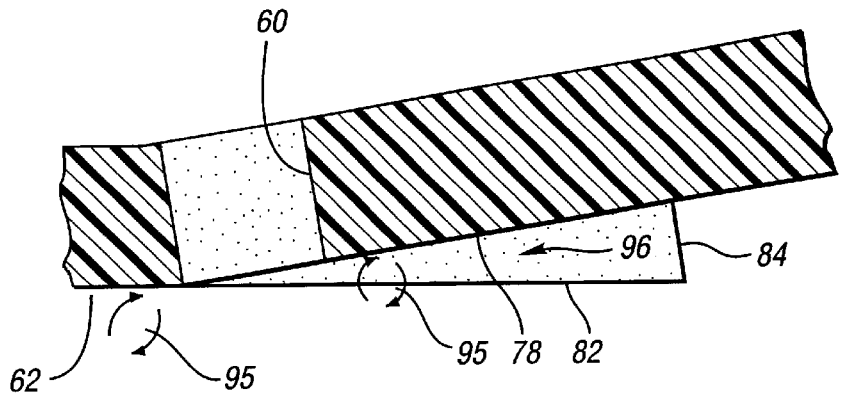

Formed integrally with the mirror housing 26 and forwardly adjacent the water removal hole are three turbulent flow generators 70, 72, 74. The turbulent flow generators are elongated generally along the direction of travel of the automotive vehicle. Turbulent flow generators 70, 72, 74 have a triangular cross-sectional shape with their longest legs 78 generally along the bottom end of the mirror housing. The second longest legs 82 of the turbulent flow generators are typically in an almost horizontal position. The shortest legs 84 of the turbulent flow generators 70, 72, 74 have squared faces 88 that are generally perpendicular to the direction of travel of the vehicle. The mirror housing bottom end 62 in the area forward of the water removal hole 60 has a gentle, upward rising slope. Inner edges 90, 92 of the outer turbulent flow generators 70, 74 bracket the water removal hole 60. The inner turbulent flow generator 72 is shorter than outer turbulent flow generators 70, Under certain conditions, water will enter the mirror housing 26 via clearance 54 between the mirror 38 and the rear opening 30. The water will settle within the mirror housing and seep down to the water removal hole 60 and thereafter escape to the ambient atmosphere. The air flow 96, as best shown in FIG. 3 by arrow 93, engages the squared faces 88 of the turbulent flow generators and turbulent flow is generated in an area which previously had laminar flow. The turbulent flow generated, shown by arrow 95, prevents laminar flow entry into the water removal hole 60 and therefore noise generated by water removal hole 60 is greatly diminished or totally abated. The elongation of the turbulent flow generators 70, 72, 74 prevents the created turbulent flow from making a hissing sound due to the grooves or gaps 96 between the turbulent flow generators.

While a preferred embodiment of the present invention has been disclosed, it has been disclosed by way of example only and that various modifications can be made without departing from the spirit and scope of the invention as it is encompassed in the following claims.

I claim:

1. An exterior rear view mirror assembly for an automotive vehicle comprising:
   a bracket for attachment to a side portion of a vehicle;
   a mirror housing having a rear opening, connected to said bracket and extending laterally therefrom;
   a mirror connected within said mirror housing generally adjacent said mirror housing rear opening;
   a water removal hole penetrating a bottom end of said mirror housing for allowing water entrapped within said mirror housing to escape therefrom;
   a turbulent flow generator formed on said mirror housing forwardly adjacent of said water removal hole to cause turbulent air flow past said removal hole to diminish wind noise being generated by said water removal hole.

2. A rear view mirror assembly as described in claim 1, wherein said water removal hole is adjacent a forward end of said opening.

3. A rear view mirror assembly as described in claim 1, wherein said mirror housing bottom end forward of said water removal hole has a generally rising slope.

4. A rear view mirror assembly as described in claim 1, wherein said water removal hole is circular.

5. A rear view mirror assembly as described in claim 1, wherein said turbulent flow generator cross-sectional shape is triangular, said turbulent flow generator having its longest leg adjacent said mirror housing bottom end and its shortest leg at a forward end.

6. A rear view mirror assembly as described in claim 5, wherein said mirror housing bottom end has a generally rising slope forward of said water removal hole.

7. A rear view mirror as described in claim 6, wherein a second longest leg of said turbulent flow generator is generally horizontal.

8. A rear view mirror assembly as described in claim 1, wherein said turbulent flow generator is elongated in a directional travel of said vehicle.

9. A rear view mirror assembly as described in claim 1, having a plurality of turbulent flow generators.

10. A rear view mirror assembly as described in claim 9, having three turbulent flow generators.

11. A rear view mirror assembly as described in claim 9, wherein a middle turbulent flow generator is shorter than two outer turbulent flow generators.

12. A rear view mirror assembly as described in claim 1, wherein said turbulent flow generator has a forward squared end generally perpendicular to a direction of travel of said vehicle.

13. A rear view mirror assembly as described in claim 1, having a plurality of turbulent flow generators wherein two turbulent flow generators are elongated in a direction of travel of said vehicle and the two turbulent flow generators bracket said water removal hole.

14. A rear view mirror assembly as described in claim 1, wherein said bracket and said mirror housing are formed from a unibody construction.

15. A rear view mirror assembly as described in claim 1, wherein said mirror housing has a narrow portion end connected to said bracket.

16. A rear view mirror assembly as described in claim 15, wherein said water removal hole is positioned in said narrow portion of said mirror housing.

17. A rear view mirror assembly as described in claim 1, wherein said water removal hole is laterally more adjacent to said bracket than an extreme inboard edge of said rear opening of said mirror housing.

18. An exterior rear view mirror assembly for an automotive vehicle comprising:
    a bracket for attachment to a side portion of a vehicle;
    a mirror housing having a rear opening, connected to said bracket and extending laterally therefrom;
    a mirror connected within said mirror housing generally adjacent said mirror housing rear opening;
    a water removal hole penetrating a bottom end of said mirror housing adjacent a forward end of said mirror housing for allowing water entrapped within said mirror housing to escape therefrom, said mirror housing bottom end forward of said water removal hole having a generally rising slope; and
    three turbulent flow generators formed on said mirror housing forwardly adjacent of said water removal hole to cause turbulent air flow past said water removal hole to diminish noise being generated by said water removal hole, said turbulent flow generators having a generally triangular cross-sectional shape with a longest leg of said triangle being generally adjacent to said lower end of said mirror housing, said triangular turbulent flow generators extending longitudinally along the travel direction of said vehicle and the two turbulent flow generators bracket said water removal hole.

* * * * *